(12) United States Patent
Boonyaratanakornkit et al.

(10) Patent No.: US 8,606,750 B2
(45) Date of Patent: Dec. 10, 2013

(54) SYSTEMS AND METHODS FOR LABORATORY ASSAY VALIDATION OR VERIFICATION

(75) Inventors: Jerry Boonyaratanakornkit, Davis, CA (US); Erhard Schoenbrunner, Moraga, CA (US); Marc Balcer, San Francisco, CA (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 13/294,382

(22) Filed: Nov. 11, 2011

(65) Prior Publication Data

US 2012/0123997 A1    May 17, 2012

Related U.S. Application Data

(60) Provisional application No. 61/413,322, filed on Nov. 12, 2010.

(51) Int. Cl.
*G06F 17/00* (2006.01)

(52) U.S. Cl.
USPC ............ 707/609; 707/E17.005; 707/E17.032; 435/287.2

(58) Field of Classification Search
USPC ............ 707/609, E17.005, E17.032; 435/6.1, 435/29, 325, 320.1, 235.1, 6.11, 287.2, 7.1
See application file for complete search history.

(56) References Cited

U.S. PATENT DOCUMENTS

| | | | |
|---|---|---|---|
| 5,858,692 A * | 1/1999 | Friedman et al. | 435/7.93 |
| 5,985,582 A * | 11/1999 | Triscott | 435/7.1 |
| 6,607,911 B2 * | 8/2003 | Gordon et al. | 435/320.1 |
| 6,818,762 B2 * | 11/2004 | Rundell et al. | 435/6.12 |
| 2002/0174001 A1 | 11/2002 | Henry | |
| 2004/0018506 A1 | 1/2004 | Koehler et al. | |
| 2005/0044110 A1 | 2/2005 | Herzenberg et al. | |
| 2005/0054083 A1 * | 3/2005 | Vuong et al. | 435/287.2 |
| 2005/0102166 A1 | 5/2005 | Tohma | |
| 2005/0131734 A1 | 6/2005 | Sugiyama | |
| 2006/0160074 A1 * | 7/2006 | Dorn et al. | 435/6 |
| 2006/0271406 A1 | 11/2006 | Califano et al. | |
| 2007/0026433 A1 * | 2/2007 | Hildebrand et al. | 435/6 |
| 2007/0178474 A1 * | 8/2007 | Cracauer et al. | 435/6 |

(Continued)

OTHER PUBLICATIONS

Ray et al.—"A strategy for improving comparability across sites for ligand binding assays measuring therapeutic proteins"—Journal of Pharmaceutical and Biomedical Analysis—vol. 53, Issue 3, Nov. 2, 2010, pp. 729-734.*

(Continued)

*Primary Examiner* — Jean B Fleurantin
*Assistant Examiner* — Anh Ly

(57) ABSTRACT

Systems and methods are used to generate a protocol for an assay. At least one performance characteristic parameter of an assay and at least one standardized protocol for each assay of a plurality of assays and assay types are stored. A performance characteristic parameter selection and an assay selection are received from a client device of a laboratory. One or more performance characteristic parameters and a standardized protocol are retrieved from the database device. The client device is sent the one or more performance characteristic parameters and one or more study variable values. One or more amendments to the one or more performance characteristic parameters and one or more study variable values are received from the client device. A protocol for the assay is generated based on the one or more amendments.

16 Claims, 10 Drawing Sheets

(56) References Cited

U.S. PATENT DOCUMENTS

| | | | |
|---|---|---|---|
| 2007/0245184 A1* | 10/2007 | Benfield et al. | 714/724 |
| 2008/0261220 A1* | 10/2008 | Cracauer et al. | 435/6 |
| 2009/0197275 A1* | 8/2009 | Schoenbrunner et al. | 435/6 |
| 2009/0267049 A1* | 10/2009 | Cho et al. | 438/47 |
| 2009/0276463 A1* | 11/2009 | Miller | 707/104.1 |
| 2010/0129902 A1* | 5/2010 | Schoenbrunner et al. | 435/325 |
| 2011/0256562 A1* | 10/2011 | Ky et al. | 435/7.94 |
| 2011/0318813 A1* | 12/2011 | Schoenbrunner et al. | 435/235.1 |
| 2012/0088233 A1* | 4/2012 | Boonyaratanakornkit et al. | 435/6.1 |
| 2012/0123997 A1* | 5/2012 | Boonyaratanakornkit et al. | 707/609 |
| 2012/0231539 A1* | 9/2012 | Schoenbrunner et al. | 435/325 |
| 2013/0017556 A1* | 1/2013 | Pritchard, Jr. | 435/7.4 |

OTHER PUBLICATIONS

Francisco L. Redondo—Probability of Disease Ascertained by Modified Cumulative Frequency Plots: Some Comments—Clinical Chemistry, vol. 34, No. 11, 1988 (p. 2389 (one page)).*

"ISO 17511:2003(E)", Aug. 15, 2003.

PCT/US11/60416, "Internatonal Search Report and Written Opinion", Sep. 21, 2012, pp. 1-7.

* cited by examiner

Step 1: Create a New Study

To create a new study, first define the laboratory location. If using a regulatory approved assay, select the assay from the package assay list otherwise define the test type, assay, analyte, and instrument characteristics. Select pre-defined or customized guidelines based on your laboratory regulations.

Lab and Assay Identification
- Validation Start Date
- Laboratory Name: Life Technologies
- Laboratory Location: United States
- Packaged Assay: Roche COBAS® AmpliPrep/COBAS® TaqMan HBV
- Assay Name: Roche COBAS® AmpliPrep/COBAS® TaqMan HBV Assay Info
- Test Type: Verification
- Assay Type: Quantitative
- Analyte: HBV
- Units: IU/mL
- Sample Type: Plasma (EDTA) *

[Previous] [Next]

FIG. 2

Step 3: Select Instruments, Input Volumes, and Controls

Instrument Info
- Extraction System [Roche ▼] [COBAS® AmpliPrep ▼]
- Amplification System [Roche ▼] [COBAS® TaqMan® 48 ▼] [K-carrier (24) ▼]

Define the number of additional controls required to run the assay (e.g. external run controls and kit controls). If an LOD study is selected, select the closest estimated LOD range for your assay. Enter the input volume for your extraction instrument.

Additional Plate Controls
- Independent Run Controls
  ☑ OptiQual® HBV DNA Low Positive Control
  ☑ OptiQual® HBV DNA Mid Positive Control
  ☑ OptiQual® HBV DNA High Positive Control
- Kit Controls [3]
- Lab-Provided Controls [0]

Additional Assay Properties
- Input Volume into Extraction [650] µL

[Previous] [Next]

410 — Instrument Info
420 — Additional Plate Controls
430 — Additional Assay Properties
400

FIG. 4

Step 4: Order Summary

View study and product levels for a detail summary of materials required. In order to save study, you will be prompted to login.

Study Outline

Total Reactions: 87

| Parameter | Days | Runs | Reps | Levels | | Class | Max Days | Max Runs | Max Reps | Max Levels |
|---|---|---|---|---|---|---|---|---|---|---|
| Repeatability | 1 | 1 | 3 | 3 | | Controls | 3 | 1 | 3 | 3 |
| Reproducibility | 3 | 3 | 3 | 3 | | | | | | |
| Accuracy | 4 | 1 | 2 | 5 | | Panels | 4 | 1 | 2 | 5 |
| Linearity | 1 | 1 | 2 | 4 | | | | | | |
| Normal Values | 1 | 1 | 1 | 20 | | Patient Samples | 1 | 1 | 1 | 20 |

Order

| Catalog # | Name | Quantity | Lot Number | Expiration Date |
|---|---|---|---|---|
| 95-0150 | ValiQuant™ HBV DNA Quantification Panel | 8 | | |
| 96-0601 | OptiQual® HBV DNA Low Positive Control | 3 | | |
| 96-0602 | OptiQual® HBV DNA Mid Positive Control | 3 | | |
| 96-0603 | OptiQual® HBV DNA High Positive Control | 3 | | |

[View Levels] [View Study Structure]

To save your study for future viewing, click "Save Study." To request a quote, select "Request Quote" and click "Save Study."

☐ Request a Quote

710 — (Study Outline)
720 — (Order)
730 — (Save/Request)

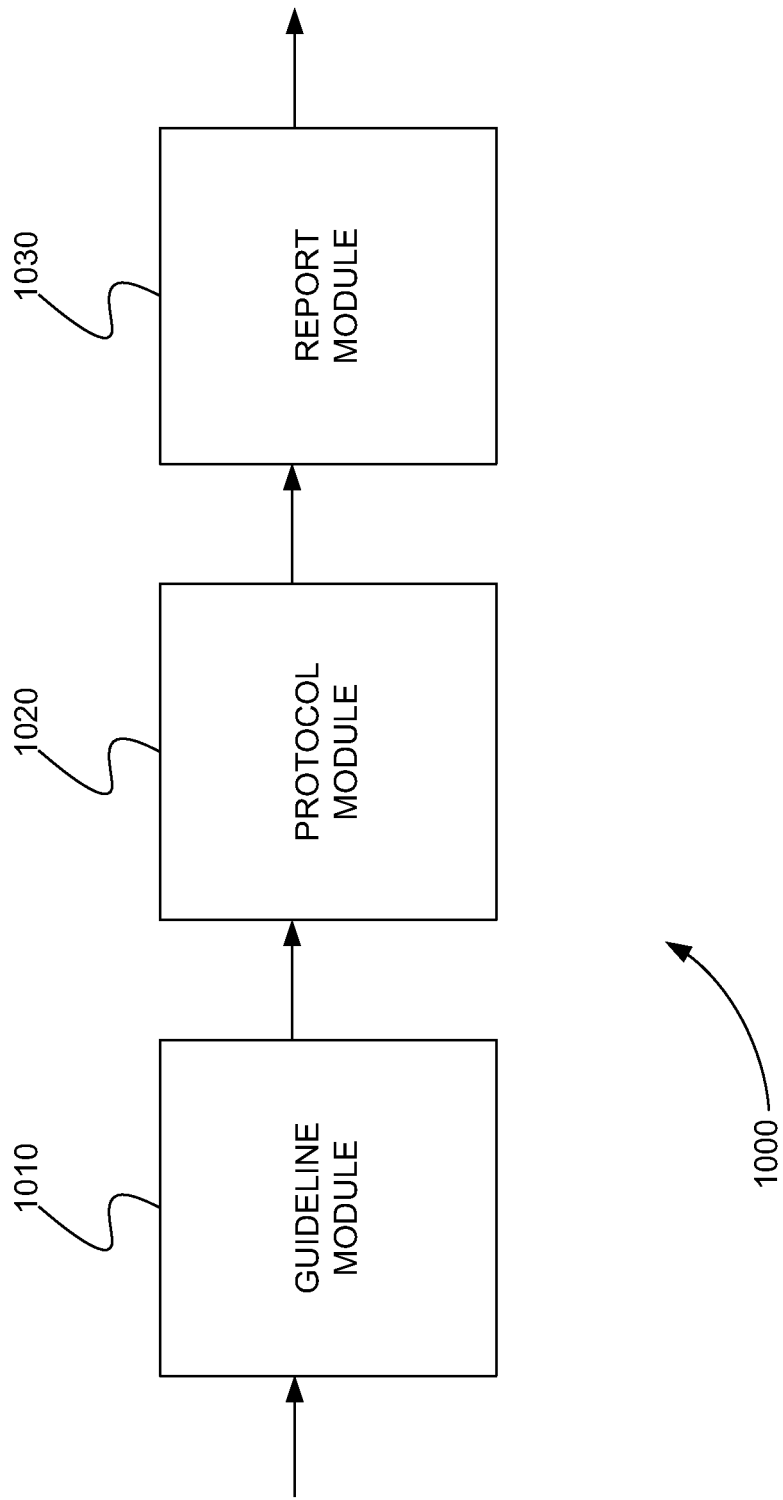

SYSTEMS AND METHODS FOR LABORATORY ASSAY VALIDATION OR VERIFICATION

CROSS-REFERENCE TO RELATED APPLICATIONS

This application claims priority to U.S. Ser. No. 61/413,322, filed Nov. 12, 2010, the disclosures of which are hereby incorporated herein by reference in their entirety as if set forth fully herein.

INTRODUCTION

A clinical diagnostic laboratory is required to perform a validation study or verification study of a diagnostic assay before that laboratory can implement the assay and report patient results from the assay. A validation study is a study designed for an assay that has not yet been approved by a regulatory organization. This includes laboratory developed assays, analyte specific reagent (ASR) based assays, and modified regulatory approved assays. In contrast, a verification study is a study for an assay that has been approved by a regulatory organization. A regulatory organization that approves assays in the United States is, for example, the Food and Drug Administration (FDA).

A clinical diagnostic laboratory in the United States, Europe, and other parts of the world is typically legally required to perform a validation study or verification study as demanded by the appropriate regulatory agency, peer-review authority, or governing body for that laboratory. A governing body in the United States for a diagnostic laboratory can include, but is not limited to, the state of New York, the College of American Pathologists (CAP), or the Clinical Laboratory Improvement Amendments (CLIA) regulated by the Centers for Medicare and Medicaid Services (CMS). In contrast European laboratories need to fulfill different requirements as e.g. described in ISO 15189. CAP requirements and ISO 15189 guidelines are not very specific and leave room for interpretation. Therefore laboratories usually customize their validation or verification studies to their specific needs and need to interpret their governing guideline.

Surveys show that it takes approximately 30 days for a clinical diagnostic laboratory to interpret the guidelines of a governing body and determine the requirements for a validation or verification study needed for a new assay from these guidelines. It then takes between three months to a year for the study to be run and the results to be approved by the laboratory director and/or governing body. In addition, the laboratory must characterize, source, and order materials required to run the study. The materials that are required to run the study can include, assay reagents, sample preparation reagents, patient specimens, and defined concentrations of analyte in a defined sample matrix. Finally, all studies must be completed and approved before the assay can generate any revenue to cover these expenses. As a result, validating or verifying a new assay represents a significant investment of time, material, and money for a clinical diagnostic laboratory.

BRIEF DESCRIPTION OF THE DRAWINGS

The skilled artisan will understand that the drawings, described below, are for illustration purposes only. The drawings are not intended to limit the scope of the present teachings in any way.

FIG. 2 is an exemplary study creation screen of a system for generating a protocol for an assay, in accordance with various embodiments.

FIG. 4 is an exemplary study variable value selection screen of a system for generating a protocol for an assay, in accordance with various embodiments.

FIG. 7 is an exemplary order summary screen of a system for generating a protocol for an assay, in accordance with various embodiments.

FIG. 10 is a schematic diagram of a system that includes one or more distinct software modules that performs a method for generating a protocol for an assay, in accordance with various embodiments.

Figure 1:
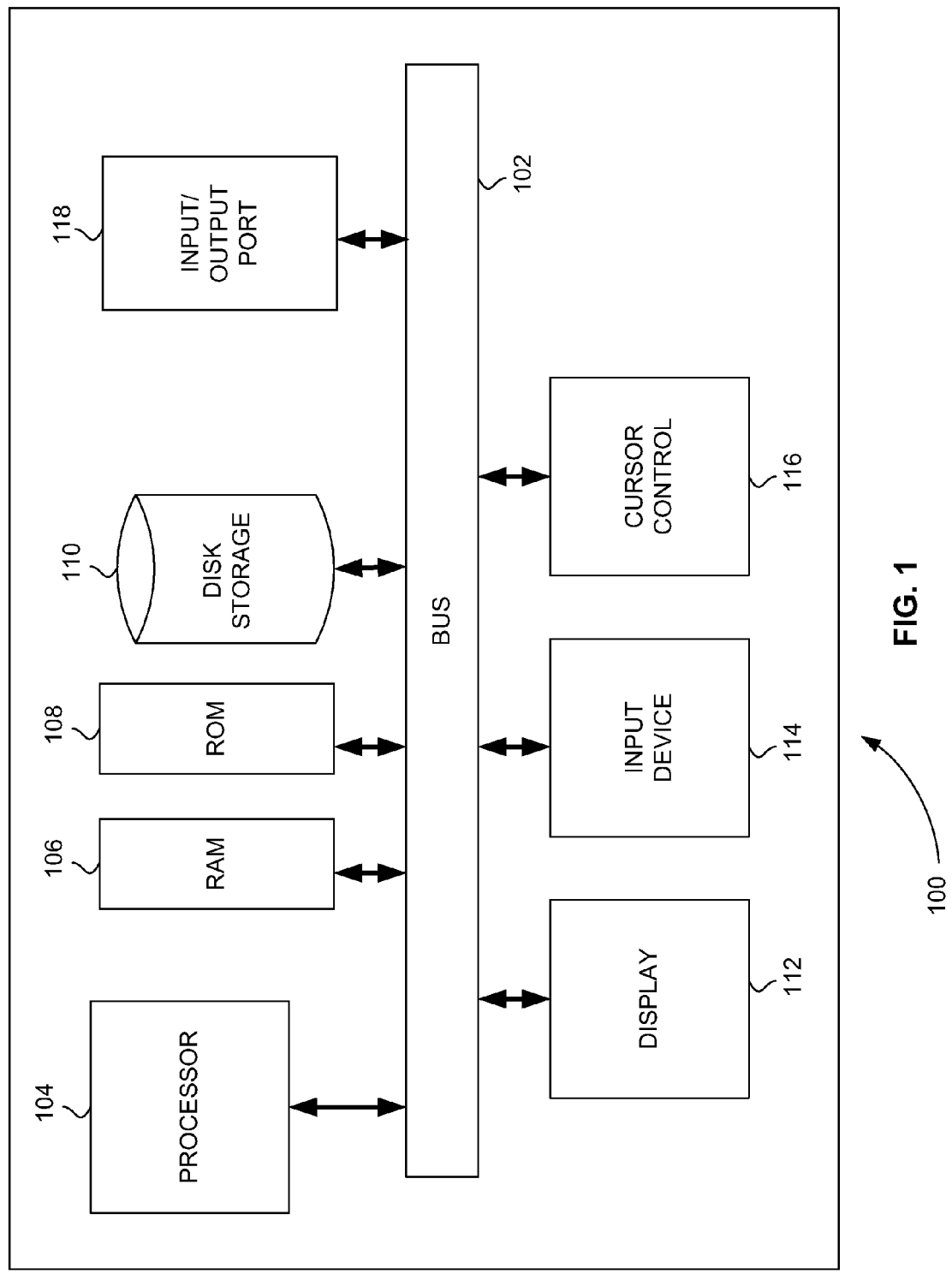
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for determining base calls, and instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane. In various embodiments, functionality of the input device 116 and the display 112 can be combined, such as with a touch screen.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

Computer system 100 also includes input/output port 118. Input/output port 118 can be used to connect to a communications device. A communications device can include a wired or wireless network interface device. A wired or wireless network interface device can be connected to a network that is private or public. An exemplary public network is the Internet, for example. A wired or wireless network interface device can be connected to the Internet through one or more computers of one or more Internet service providers (ISPs). Computer system 100 can be part of a system that can include, but is not limited to, a distributed computing system, a Web-based system, a cloud computing system, a software as a service system (SAAS), or any combination thereof.

The term "non-transitory computer-readable medium" as used herein refers to any tangible and non-transitory media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible and non-transitory medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a network, such as a wireless network, a wired network, or a combination thereof. Input/output port 118 can receive the data from the network and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a tangible and non-transitory computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Systems and Methods of Data Processing

As described above, a clinical diagnostic laboratory cannot implement an assay and report patient results from that assay until a protocol based on established guidelines for the assay is performed and the results and reports generated from the study are approved. Interpreting the guidelines of a governing body, determining the requirements of the study from the guidelines, obtaining materials, performing the study, and obtaining approval for the results can take more than one year. During that time no revenue can be generated from the assay to offset the reagent and personnel costs to execute the study. Additionally, since the assay has not been implemented, current patient specimens may have to be sent to an outside laboratory with a validated or verified assay to perform the testing. This can result in payments to the outside lab and additional costs due to the shipping and handling charges. Consequently, any time that can be saved in the process of validating or verifying an assay can result in earlier generation of revenue and a reduction in overall cost to the laboratory by bringing the assay in-house.

In various embodiments, systems and methods can be used to automatically generate a protocol for an assay. The protocol can be guideline-based, for example. The protocol can be generated based on a number of inputs provided by a laboratory, a number of stored and standardized protocols that are known to satisfy a guideline, and logic used to calculate values for variables of the standardized protocols based on the inputs. Such systems and methods can speed the process of validating or verifying an assay by eliminating the time a laboratory needs to interpret a guideline, obtain materials, and determine the requirements for the guideline. Such systems and methods can also speed the process of validating or verifying an assay and lower the cost of the process by optimizing the number of days required to perform the study and optimizing the amount of material used in a study.

In various embodiments, one or more guidelines from one or more governing bodies, from a laboratory, or from a peer-review authority or peer-reviewed literature can be interpreted. The one or more guidelines can be interpreted by conducting a literature search, for example. These literature searches can be conducted regularly, the latest changes to guidelines are interpreted, and the standardized protocols are updated accordingly. Interpreting the one or more guidelines can include determining performance characteristic parameters of an assay for one or more guidelines. These performance characteristic parameters of an assay can include, but are not limited to, accuracy, linearity, normal values, repeatability, reproducibility, clinical sensitivity, clinical specificity, analytical sensitivity, analytical specificity, cross-reactivity, precision, within run precision (intra assay), between run precision (inter assay), cut-off determination, influence of potentially interfering substances (such as, e.g., anticoagulants (e.g., citrate, EDTA, heparin), therapeutic drugs, sodium azide, haemolytic, enteric, icteric, lipemic, and ethanol, PCR inhibitors), inclusivity (ability to detect variants of an analyte, e.g., viral subtypes), and limit of detection (LOD). The sum of the tested performance characteristic parameters can provide a nonclinical performance evaluation of the assay.

A protocol can be developed from just one performance characteristic parameter, for example. In various embodiments, a protocol can be developed from two or more performance characteristic parameters. For example, a protocol can be developed using the most difficult requirements of two or more performance characteristic parameters.

In various embodiments, one or more standardized protocols are developed for one or more assays or assay types. A standardized protocol includes one or more study variables that meet the interpreted requirements of the one or more guidelines. The one or more study variables can include, but are not limited to, the number of replicates, the number of levels, the number of runs, the number of days needed to run the study, or the type of instrument used to run the study.

A guideline can be selected by a laboratory or determined based on information provided by a laboratory, such as the location of the laboratory, analyte, and the regulatory status of the assay. An assay or assay type, for example a quantitative or qualitative assay, can also be selected by the laboratory. Based on the selected guideline, performance characteristic parameters can be retrieved from storage. Based on the selected assay or assay type, selected guideline, and performance characteristic parameters, a standardized protocol can be retrieved from storage. The performance characteristic parameters and study variables of the retrieved standardized protocol can be populated with default values. These default values can then be selected, deselected, overridden, or accepted by the laboratory. The performance characteristic parameters and study variables of the retrieved standardized protocol can then be optimized and a protocol customized specifically for the laboratory is generated. For example, the system can adjustment to the performance characteristic parameters or the study variables to minimize time needed for the study, reagents consumed during the study, or instrument time used during the study, or combinations thereof. Additionally, adjustments can be made to one of the performance characteristic parameters or the study variables to achieve agreement with the other.

FIG. 2 is an exemplary study creation screen 200 of a system for generating a protocol for an assay, in accordance with various embodiments. Screen 200 shows the creation of a verification study. Alternatively, a laboratory can use screen 200 to create a laboratory developed validation study. Screen 200 can include laboratory and assay identification fields 210. Screen 200 also can include assay information fields 220, which include assay type, analyte, units, and sample type for. One or more guidelines for the laboratory can be determined by selecting a laboratory location using location field 230. A standardized protocol can be determined for a guideline of the one or more guidelines by selecting a pre-packaged assay using pre-packaged assay field 240 or by selecting a study type using test type field 250.

A pre-packaged assay can be available for a verification study. Therefore, if a pre-packaged assay is selected in pre-packaged assay field 240, test type field 250 can be also set to verification. As described above, a verification study is a study for an assay that has been approved by a regulatory organization. Therefore, the study variables of the determined standardized protocol for the verification study can typically be well defined.

In contrast, a validation study is a study for a lab-developed assay, or an assay that has not been approved by a regulatory organization. A validation study can be, therefore, typically more complex and allows more customization of the study variables of the study. Consequently, selecting validation in test type field 250 can determine a standardized protocol for a guideline that generally requires more customization of the study variables.

For example, after selecting validation in test type field 250 an assay type, an analyte, units of measurement, and a sample type can be required and can be entered as shown in assay information fields 220. An assay type can be quantitative or qualitative, for example. A sample type can include, but is not limited to, plasma, serum, or whole blood. A sample type can be particularly important for validation. According to regulations, an assay has to be validated for a specific sample type. For example, if an assay is intended for the analysis of an analyte that is plasma, a study must be performed with plasma samples. If the assay is intended for additional sample types like serum, a separate validation study can be performed for serum and the other additional sample types.

Figure 3:
FIG. 3 is an exemplary guideline and parameter selection screen of a system for generating a protocol for an assay, in accordance with various embodiments.

FIG. 3 is an exemplary guideline and parameter selection screen 300 of a system for generating a protocol for an assay, in accordance with various embodiments. As described above, more than one guideline can be determined from a laboratory location. As a result, guideline selection field 310 can allow a laboratory to select a guideline if two or more guidelines are available. Based on the guideline selected in guideline selection field 310, performance characteristic parameters field 320 can be populated with selected parameters for that guideline. A laboratory can deselect any of the selected parameters in parameters field 320.

As shown in screen 300, a guideline can be selected from list generated from the location of laboratory. The performance characteristic parameters in parameters field 320 can be deselected to slightly modify the guideline. However, all other parameters of the guideline can be preset.

Preset, standardized guidelines can sometimes be problematic for both small and large laboratories. For example, a preset guideline for an assay may require a large amount of materials and reagents that is too cost-prohibitive for a small laboratory. As a result, the small laboratory may want to modify the preset guideline to include, for example, 5 replicates instead of 10. On the other hand, a large laboratory may be interested in producing the highest confidence level in their results for the same assay. Such a large laboratory may want to modify the preset guideline to include, for example, 50 replicates instead of 10.

In various embodiments, a guideline can be customized by a laboratory. A plurality of properties, parameters, acceptance criteria, or variables of the guideline can be set, selected, or deselected by the laboratory. The plurality of properties, parameters, or variables can be cloned and modified from an existing guideline or can be provided by the laboratory. An existing guideline can be a guideline for the laboratory's location or for another location. The laboratory can also save a custom guideline as a laboratory specific guideline.

FIG. 4 is an exemplary study variable value selection screen 400 of a system for generating a protocol for an assay, in accordance with various embodiments. Screen 400 can be used to assign values to study variables of a standardized protocol. Instrument selection fields 410 can be used to specify the instruments and potential sample layouts used by the standardized protocol. Plate controls fields 420 can be used to specify the control variable values used by the standardized protocol. Control variable values can include independent run controls that may be commercially sourced or developed internally by the lab, or assay specific kit controls specified by the assay product insert. Assay properties fields 430 can be used to specify the values of additional assay properties used by the standardized protocol. The assay properties fields can include, but are not limited to, required volumes for each extraction and a required dead volume for the sample preparation instrument.

Screen 400 is used, for example, to select or input values for the study variables of a verification study. A validation study, in contrast, typically includes many more study variables and selectable values. For example, validation study variables and selectable values that can include, but are not limited to, selectable plate layout fields, an estimated LOD, and dilutions for interfering substances.

From the inputs and selections made in FIGS. 2-4 a standardized protocol can be selected and its parameters and study variables are optimized. A protocol can then be generated for the laboratory. The protocol can be output to the screen, printed, or stored in any file format. For example, the protocol is stored in portable document format (PDF). The protocol includes everything a laboratory needs to run the study. The guideline-based protocol can include, but is not limited to, a listing of the materials and reagents, an explanation of the dilution of the materials, an explanation of the handling of the materials, and a day by day schedule of activities. A protocol can also include a plate layout for any instrument selected for the study by the laboratory.

In various embodiments, the system may optimize the use of reagents. The system can calculate quantities of reagents consumed during the study and retrieve available sizes of the reagents. The system can modify the protocol to minimize reagent waste. For example, the system can calculate an amount of reagent needed for each day and arrange the daily schedule to minimize the number of times a new quantity of reagent may be needed during a day, minimize the number of days between opening a new quantity of a reagent and consuming the quantity of the reagent, minimize the amount of opened reagent that goes unused over a break in the daily schedule such as a weekend or holiday, or the like.

In various embodiments, the system may optimize the use of instruments. The system can determine an amount of instrument time needed and arrange the daily schedule to minimize the time the instrument is idle, maintain the instrument time used daily below a threshold to ensure the availability of the instrument for other tests, or the like.

Figure 5:
FIG. 5 is an exemplary day by day schedule of product levels from a protocol, in accordance with various embodiments.
Figure 6:
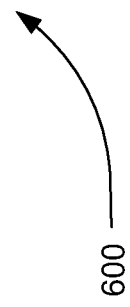
FIG. 6 is an exemplary plate layout from a protocol, in accordance with various embodiments.

FIG. 5 is an exemplary day by day schedule of product levels 500 from a protocol, in accordance with various embodiments. Schedule of product levels 500 indicates the number of levels and replicates required for the study as well as determining the optimal levels, days, and replicates for the study. Schedule of product levels 500 also indicates the type of material required for the study including quantitated/value assigned material, non-value assigned material, and patient specimen. FIG. 6 is an exemplary plate layout 600 from a protocol, in accordance with various embodiments.

After a standardized protocol is selected and performance characteristic parameters and study variables are optimized, information other than the protocol can also be generated. For example, a spreadsheet or other type of file can be generated to receive results from running the study. This file can later be used to validate the results with the guideline.

Another problem for laboratories is sourcing and characterizing the materials used in a validation or verification study. In various embodiments, materials can be linked with a generated protocol. For example, these materials can be listed, quantified or un-quantified. These materials can include, but are not limited to, samples, routine samples, reagents, quality control materials, calibrators (e.g., measurement standards), primary calibrator, secondary calibrator, manufacturer's working calibrator, manufacturer's product calibrator, non-value assigned materials, assayed controls, un-assayed controls, International conventional calibration materials, reference materials, a patient specimen, a positive control, a negative control, standardized materials, traceable materials including an assigned titer value and an uncertainty value as e.g. defined in ISO 17511 (e.g., WHO standards), otherwise value-assigned materials, commutable materials (that is, they behave like patient samples), or panels (e.g., at least two different samples having different titers such as a dilution series, or an array). These materials can be naturally occurring, such as, cell lines, FFPE, semi synthetic (e.g. armored RNA or SynTura like materials) or synthetic (e.g. DNA, RNA, plasmids, proteins). Materials can further include dilution reagents for any of the above. Further, these specific materials can be ordered directly from a supplier.

In various embodiments, an order summary can also be generated after a standardized protocol is selected and performance characteristic parameters and study variables are optimized. An order summary is a listing of the minimum amount of material needed to run the study based on the laboratory inputs and the selected guideline. The minimum amount of material can be found by optimizing the number of replicates or samples needed for the study. For example, a certain guideline may require six panels and seven levels to determine accuracy and five panels and four levels to determine linearity. Because the linearity requirement of the guideline needs fewer panels and levels than the accuracy requirement, the linearity information can be obtained from the accuracy data. In other words, separate samples may not be needed to obtain accuracy and linearity information.

Similarly, the minimum amount of material can be found by optimizing the handling of samples. For example, if an instrument selected by a laboratory needs 500 µL of a sample, and the laboratory has already ordered a vial with 1 mL of the sample, the laboratory can get two samples for the study from the already ordered and opened vial. The use of samples over time can also be taken into account by this optimization. For example, some samples can be adversely affected by being frozen and thawed multiple times. As a result, multiple accesses to a vial of material can be preferably scheduled to occur on the same day.

FIG. 7 is an exemplary order summary screen 700 of a system for generating a protocol for an assay, in accordance with various embodiments. Order summary screen 700 includes study outline schedule 710. Study outline schedule 710 can be optimized to use a minimum amount of material. The minimum amount of material found can be listed in order section 720. Further a quote for this minimum amount of material can be obtained by selecting request a quote selection 730. A quote can be obtained from a material supplier using request a quote selection 730, for example. Request a quote selection 730 provide communication access to a supplier. This communications access can include, but is not limited to, an email, a hyperlink, a text message, or a telephone number.

Once a protocol is generated, a laboratory can order the materials and run the study. Results are collected from one or more instruments used to run the study. These results can then be analyzed statistically based on the parameters selected for a guideline. Results are presented to the analysis by manually entering the data, by entering the data in a spreadsheet and uploading the spreadsheet, or by uploading the data directly from the one or more instruments used to run the study.

In the analysis of results, values can be calculated for each of the parameters selected for the guideline. Data produced by the analysis can be compared to an acceptance criteria set by the end-user prior to executing the study. The results of this comparison are displayed or printed as a report. Reports for verification and validation studies are similar. However, reports from validation studies typically list more parameters. Reports can be approved, disapproved, or accepted with justification. If data produced by the analysis does not meet the acceptance criteria set in the study, there is an option to revise the acceptance criteria as long as a justification is provided.

In various embodiments, two or more levels of access are provided to the analysis and the report. For example, there is a low level access for a laboratory technician and a high level access for a laboratory manager or director. With the high level access, a laboratory manager can approve a report, disapprove a report, accept a report and provide justification, or change the acceptance criteria in the analysis or the report. With the low level access, a laboratory technician may view protocols and reports and enter results.

Laboratory Assay Validation or Verification System

Figure 8:
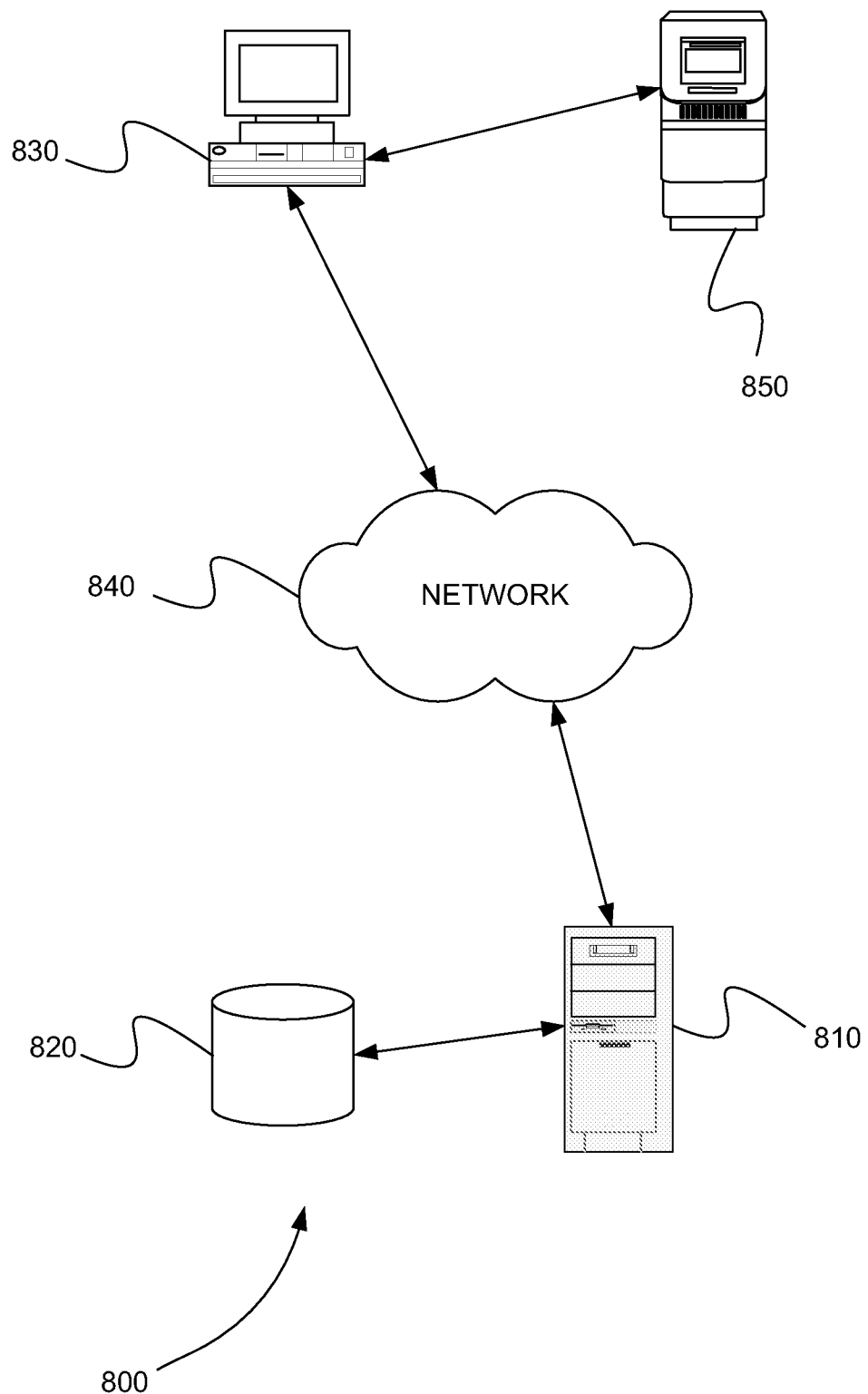
FIG. 8 is a schematic diagram showing a system for generating a protocol for an assay, in accordance with various embodiments.

FIG. 8 is a schematic diagram showing a system 800 for generating a protocol for an assay, in accordance with various embodiments. System 800 includes server computer 810, database device 820, and a communications device (not shown). Server computer 810 is in communications with database device 820 and the communications device. Database device 820 is shown in FIG. 8 as connecting directly to server computer 810. In various embodiments, database device 820 can be connected indirectly to server computer 810 through any private or public network including network 840, for example.

Database device 820 is shown in FIG. 8 as a device that is separate from server computer 810. In various embodiments, database device 820 can include a hardware component of server computer 810, such as a storage disk drive. Similarly, the communications device is, for example, a network interface device that is part of server computer 810 in FIG. 8. In various embodiments, the communications device can be a device that is separate from server computer 810.

Database device 820 stores at least one performance characteristic parameter of an assay. Database device 820 also stores at least one standardized protocol for each assay of a plurality of assays and assay types. Database device 820 is shown in FIG. 8 as one physical device. One skilled in the art can appreciate that in various embodiments database device 820 can include two or more physical devices. Database device 820 can also include one or more logical databases.

Server computer 810 receives a performance characteristic parameter selection and an assay selection from client device 830 of a laboratory through the communications device. A performance characteristic parameter selection can include, but is not limited to a guideline selection. For example, server computer 810 is connected to network 840 through the communications device. Client device 830 is also connected to network 840. As a result, server computer 810 communicates with client device 830 across network 840. Network 840 can be a private network or a public network. Network 840 is, for example, the Internet. Server computer 810 and client device 830 can communicate across network 840 using the hypertext transport protocol (HTTP), for example. Server computer 810 and client device 830 can then effectively communicate by exchanging Web pages, where server computer 810 is a web server and client device 830 is a Web client.

Client device 830 may be connected to network 840 through a client communications device. Client device 830 can be, but is not limited to, a computer, a laboratory instrument, a tablet device, a mobile device, or any device capable of processing information and communicating across a network.

Client device 830 can also be connected directly to laboratory instrument 850. In various embodiments, client device 830 is a server computer for a laboratory information system (LIS). A server computer for an LIS connects to other computers (not shown) that are connected to one or more laboratory instruments. The server computer of an LIS receives all the data generated by all of the instruments of the laboratory, for example.

In response to receiving the performance characteristic parameter selection and the assay selection, server computer 810 can retrieve one or more performance characteristic parameters and a standardized protocol from the database device based on the performance characteristic parameter selection and the assay selection. Server computer 810 can send client device 830 the one or more performance characteristic parameters and one or more study variable values of the standardized protocol through the communications device. Server computer 810 can receive from client device 830 one or more amendments to the one or more performance characteristic parameters and the one or more study variable values of the standardized protocol through the communications device. Finally, server computer 810 generates a protocol for the assay based on the one or more amendments. A protocol can include, but is not limited to, a validation protocol a verification protocol or a laboratory defined protocol. In some embodiments, the protocol is guideline based.

In various embodiments, the performance characteristic parameter selection received by server computer 810 is a laboratory location. Server computer 810 can then retrieve one or more performance characteristic parameters from the database device based on a guideline determined from the laboratory location.

In various embodiments, server computer 810 can further generate an order summary for the materials used by the protocol. The materials can include, for example, a panel or positive control materials. Server computer 810 can optimize the number of samples used by the protocol to minimize the quantities of the materials listed on the order summary.

In various embodiments, server computer 810 can further receive results from client device 830 after running the protocol, calculates parameter values for the one or more performance characteristic parameters based on the results, compares the parameter values to acceptance criteria for the selected guideline, and generates a report for the comparison. Server computer 810 also can further receive an amendment to at least one acceptance criterion from client device 830 after running the protocol.

Laboratory Assay Validation or Verification Method

Figure 9:
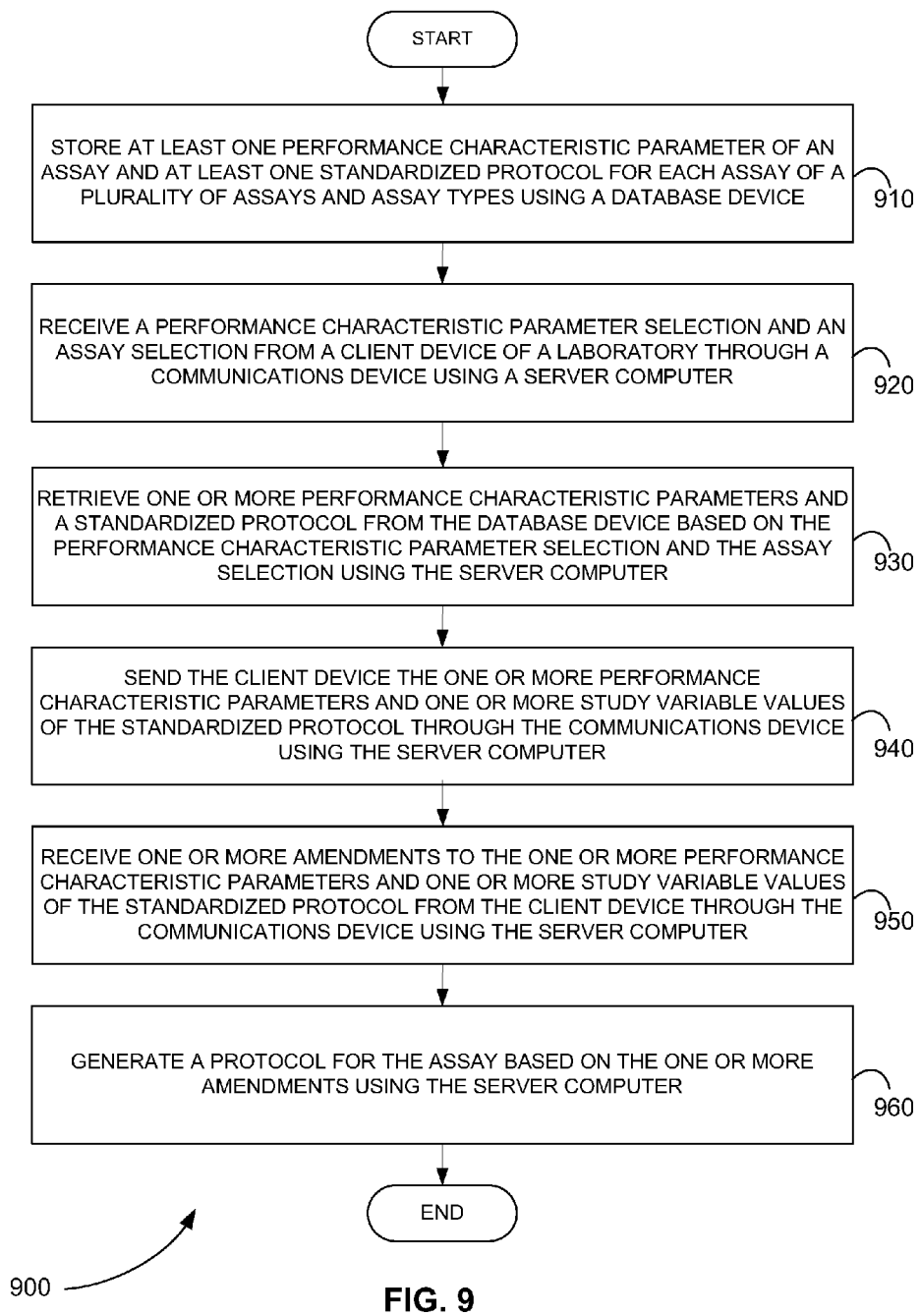
FIG. 9 is an exemplary flowchart showing a method for generating a protocol for an assay, in accordance with various embodiments.

FIG. 9 is an exemplary flowchart showing a method 900 for generating a protocol for an assay, in accordance with various embodiments.

In step 910 of method 900, at least one performance characteristic parameter of an assay and at least one standardized protocol for each assay of a plurality of assays and assay types can be stored using a database device.

In step 920, a performance characteristic parameter selection and an assay selection can be received from a client device of a laboratory through a communications device using a server computer.

In step 930, one or more performance characteristic parameters and a standardized protocol can be retrieved from the database device based on the performance characteristic parameter selection and the assay selection using the server computer.

In step 940, the client device can be sent the one or more performance characteristic parameters and one or more study variable values of the standardized protocol through the communications device using the server computer.

In step 950, one or more amendments to the one or more performance characteristic parameters and one or more study variable values of the standardized protocol can be received from the client device through the communications device using the server computer.

In step 960, a protocol for the assay can be generated based on the one or more amendments using the server computer.

Laboratory Assay Validation or Verification Computer Program Product

In various embodiments, a computer program product can include a non-transitory and tangible computer-readable storage medium whose contents include a program with instructions that can be executed on a server computer so as to perform a method for generating a protocol for an assay. This method is performed by a system that includes one or more distinct software modules.

FIG. 10 is a schematic diagram of a system 1000 that includes one or more distinct software modules that performs a method for generating a protocol for an assay, in accordance with various embodiments. System 1000 can include guideline module 1010 and protocol module 1020.

Guideline module 1010 can store at least one performance characteristic parameter of an assay in a database device. Guideline module 1010 can also store at least one standardized protocol for each assay of a plurality of assays and assay types in the database device.

Protocol module 1020 can receive a performance characteristic parameter selection and an assay selection from a client device of a laboratory through a communications device. Protocol module 1020 can retrieve one or more performance characteristic parameters and a standardized protocol from the database device based on the performance characteristic parameter selection and the assay selection. Protocol module 1020 can send the client device the one or more performance characteristic parameters and one or more study variable values of the standardized protocol through the communications device. Protocol module 1020 can receive from the client device one or more amendments to the one or more performance characteristic parameters and one or more study variable values of the standardized protocol through the communications device. Finally, protocol module 1020 can generate a protocol for the assay based on the one or more amendments.

In various embodiments, system 1000 can also include report module 1030. After a protocol is run in a laboratory, the results from running the protocol can be uploaded and analyzed using report module 1030. Report module 1030 can receive the results from a client device. Report module 1030 can then analyze and compares the results against acceptance criteria. Finally, Report module 1030 can generate a report.

In a first aspect, a system for generating a protocol for an assay can include a database device, a communications device; and a server computer in communications with the database device and the communications device. The database device can be configured to store at least one performance characteristic parameter of an assay and that be configured to stores at least one standardized protocol for each assay of a plurality of assays and assay types. The server computer can be configured to receive a performance characteristic parameter selection and an assay selection from a client device of a laboratory through the communications device, and retrieve one or more performance characteristic parameters and a standardized protocol from the database device based on the performance characteristic parameter selection and the assay selection. Further, the server computer can be configured to send the client device the one or more performance characteristic parameters and one or more study variable values of the standardized protocol through the communications device, receive from the client device one or more amendments to the one or more performance characteristic parameters and one or more study variable values of the standardized protocol through the communications device, and generate a protocol for the assay based on the one or more amendments.

In various embodiments of the first aspect, the performance characteristic parameter selection can include a laboratory location and the one or more performance characteristic parameters can be retrieved from the database device based on a guideline determined from the laboratory location.

In various embodiments of the first aspect, one or more study variable values can comprise an acceptance criterion. The protocol can comprise a validation protocol. The protocol can comprise a verification protocol. The protocol can comprise a laboratory-defined protocol.

In various embodiments of the first aspect, the server computer can be further configured to generate an order summary for materials used by the protocol. The materials can comprise a panel or positive control materials. The server computer can further generate an order for the materials based on the order summary and communicates the order to a supplier. The server computer can optimize the number of samples used by the protocol to minimize the quantities of the materials listed on the order summary.

In various embodiments, the server computer can be further configured to receive results from the client device after running the protocol, calculates parameter values for the one or more performance characteristic parameters based on the results, compares the parameter values to acceptance criteria selected by the client, and generates a report for the comparison.

In various embodiments, the server computer can be further configured to receive from the client device an amendment to at least one acceptance criterion after running the protocol.

In a second aspect, a method for generating a protocol for an assay can include storing at least one performance characteristic parameter of an assay and storing at least one standardized protocol for each assay of a plurality of assays and assay types using a database device. The method can further include receiving a performance characteristic parameter selection and an assay selection from a client device of a laboratory through a communications device using a server computer, and retrieving one or more performance characteristic parameters and a standardized protocol from the database device based on the performance characteristic parameter selection and the assay selection using the server computer. The method can further include sending the client device the one or more performance characteristic parameters and one or more study variable values of the standardized protocol through the communications device using the server computer, receiving from the client device one or more amendments to the one or more performance characteristic parameters and one or more study variable values of the standardized protocol through the communications device using the server computer, and generating a protocol for the assay based on the one or more amendments using the server computer.

In various embodiments of the second aspect, the performance characteristic parameter selection can include a laboratory location and the one or more performance characteristic parameters can be retrieved from the database device based on a guideline determined from the laboratory location. One or more study variable values can include an acceptance criterion. The protocol can include a validation protocol. The protocol can include a verification protocol. The protocol can include a laboratory-defined protocol.

In various embodiments of the second aspect, the method can further include generating an order summary for materials used by the protocol using the server computer.

In various embodiments of the second aspect, the materials can include a panel or positive control materials.

In various embodiments of the second aspect, the method can further comprise generating an order for the materials based on the order summary and communicating the order to a supplier using the server computer.

In various embodiments of the second aspect, the method can further include optimizing the number of samples used by the protocol to minimize the quantities of the materials listed on the order summary using the server computer.

In various embodiments of the second aspect, the method can further include receiving results from the client device after running the protocol, calculating parameter values for the one or more performance characteristic parameters based on the results, comparing the parameter values to acceptance criteria for the selected guideline, and generating a report for the comparison using the server computer.

In various embodiments of the second aspect, the method can further include receiving from the client device an amendment to at least one acceptance criterion after running the protocol using the server computer.

In a third aspect, a computer program product can include a non-transitory and tangible computer-readable storage medium whose contents include a program with instructions being executed on a server computer so as to perform a method for generating a protocol for an assay. The method can include providing a system, wherein the system comprises one or more distinct software modules. The distinct software modules can include a guideline module and a protocol module. The method can further include storing in a database device at least one performance characteristic parameter of an assay and storing in the database device at least one standardized protocol for each assay of a plurality of assays and assay types using the guideline module. The method can further include receiving a performance characteristic parameter selection and an assay selection from a client device of a laboratory through a communications device using the protocol module, and retrieving one or more performance characteristic parameters and a standardized protocol from the database device based on the performance characteristic parameter selection and the assay selection using the protocol module. The method can further include sending the client device the one or more performance characteristic parameters and one or more study variable values of the standardized protocol through the communications device using the protocol module, receiving from the client device one or more amendments to the one or more performance characteristic parameters and one or more study variable values of the standardized protocol through the communications device using the protocol module, and generating a protocol for the assay based on the one or more amendments using the protocol module.

In various embodiments of the third aspect, the performance characteristic parameter selection comprises a laboratory location and the one or more performance characteristic parameters are retrieved from the database device based on a guideline determined from the laboratory location. One or more study variable values can include an acceptance criterion. The protocol can include a validation protocol. The protocol can include a verification protocol. The protocol can include a laboratory-defined protocol.

In various embodiments of the third aspect, the computer program product can further include generating an order summary for materials used by the protocol using the protocol module. The materials can include a panel or positive control materials. The computer program product can further include generating an order for the materials based on the order summary and communicating the order to a supplier using the protocol module. The computer program product can further include optimizing the number of samples used by the protocol to minimize the quantities of the materials listed on the order summary using the protocol module.

In various embodiments of the third aspect, the computer program product can further include providing the system with a report module and receiving results from the client device after running the protocol, calculating parameter values for the one or more performance characteristic parameters based on the results, comparing the parameter values to acceptance criteria for the selected guideline, and generating a report for the comparison using the report module. The computer program product can further include receiving from the client device an amendment to at least one acceptance criterion after running the protocol using the report module.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for generating an analytical validation protocol for an assay, comprising:
    a database device configured to store at least one performance characteristic parameter of an assay and that stores at least one standardized analytical validation protocol for each assay of a plurality of assays and assay types;
    a communications device; and
    a server computer in communications with the database device and the communications device configured to:

receive a performance characteristic parameter selection and an assay selection from a client device of a laboratory through the communications device and wherein the performance characteristic parameter selection comprises a laboratory location and the one or more performance characteristic parameters, retrieve one or more performance characteristic parameters and a standardized analytical validation protocol from the database device based on the performance characteristic parameter selection and the assay selection, send the client device the one or more performance characteristic parameters and one or more study variable values of the standardized analytical validation protocol through the communications device and wherein the one or more study variable values comprises an acceptance criterion, receive from the client device one or more amendments to the one or more performance characteristic parameters and one or more study variable values of the standardized analytical validation protocol through the communications device, and generate the analytical validation protocol for the assay based on the one or more amendments.

2. The system of claim 1, wherein the protocol comprises a validation protocol, a verification protocol, a laboratory-defined protocol, or any combination thereof.

3. The system of claim 1, wherein the server computer further generates an order summary for materials used by the protocol.

4. The system of claim 3, wherein the server computer further generates an order for the materials based on the order summary and communicates the order to a supplier.

5. The system of claim 3, wherein the server computer optimizes the number of samples used by the protocol to minimize the quantities of the materials listed on the order summary.

6. The system of claim 1, wherein the server computer further receives results from the client device after running the protocol, calculates parameter values for the one or more performance characteristic parameters based on the results, compares the parameter values to acceptance criteria selected by the client, and generates a report for the comparison.

7. The system of claim 1, wherein the server computer further receives from the client device an amendment to at least one acceptance criterion after running the protocol.

8. A computer implemented method for generating an analytical validation protocol for an assay, comprising:

storing at least one performance characteristic parameter of an assay and storing at least one standardized analytical validation protocol for each assay of a plurality of assays and assay types using a database device;

receiving a performance characteristic parameter selection and an assay selection from a client device of a laboratory through a communications device using a server computer and wherein the performance characteristic parameter selection comprises a laboratory location and the one or more performance characteristic parameters;

retrieving one or more performance characteristic parameters and a standardized analytical validation protocol from the database device based on the performance characteristic parameter selection and the assay selection using the server computer;

sending the client device the one or more performance characteristic parameters and one or more study variable values of the standardized analytical validation protocol through the communications device using the server computer and wherein the one or more study variable values comprises an acceptance criterion;

receiving from the client device one or more amendments to the one or more performance characteristic parameters and one or more study variable values of the standardized analytical validation protocol through the communications device using the server computer; and generating the analytical validation protocol for the assay based on the one or more amendments using the server computer.

9. A computer program product, comprising a non-transitory and tangible computer-readable storage medium whose contents include a program with instructions being executed on a server computer so as to perform a method for generating an analytical validation protocol for an assay, the method comprising:

storing in a database device at least one performance characteristic parameter of an assay and storing in the database device at least one standardized analytical validation protocol for each assay of a plurality of assays and assay types;

receiving a performance characteristic parameter selection and an assay selection from a client device of a laboratory through a communications device using the analytical validation protocol module and wherein the performance characteristic parameter selection comprises a laboratory location and the one or more performance characteristic parameters;

retrieving one or more performance characteristic parameters and a standardized analytical validation protocol from the database device based on the performance characteristic parameter selection and the assay selection;

sending the client device the one or more performance characteristic parameters and one or more study variable values of the standardized analytical validation protocol through the communications device and wherein the one or more study variable values comprises an acceptance criterion;

receiving from the client device one or more amendments to the one or more performance characteristic parameters and one or more study variable values of the standardized analytical validation protocol through the communications device; and generating the analytical validation protocol for the assay based on the one or more amendments.

10. The computer program product of claim 9, wherein the protocol comprises a validation protocol, a verification protocol, a laboratory-defined protocol, or any combination thereof.

11. The computer program product of claim 9, further comprising generating an order summary for materials used by the protocol.

12. The computer program product of claim 11, wherein the materials comprise a panel or positive control materials.

13. The computer program product of claim 12, further comprising receiving from the client device an amendment to at least one acceptance criterion after running the protocol.

14. The computer program product of claim 11, further comprising generating an order for the materials based on the order summary and communicating the order to a supplier.

15. The computer program product of claim 11, further comprising optimizing the number of samples used by the protocol to minimize the quantities of the materials listed on the order summary.

16. The computer program product of claim 9, further comprising receiving results from the client device after running the protocol, calculating parameter values for the one or more performance characteristic parameters based on the results, comparing the parameter values to acceptance criteria for the selected guideline, and generating a report for the comparison.

* * * * *